United States Patent [19]

Rose et al.

[11] Patent Number: 5,345,876
[45] Date of Patent: Sep. 13, 1994

[54] HYBRID INFLATOR

[75] Inventors: James Rose, Fairfax; Charles D. Woods, Gainesville, both of Va.

[73] Assignee: Atlantic Research Corporation, Vienna, Va.

[21] Appl. No.: 13,600

[22] Filed: Feb. 4, 1993

[51] Int. Cl.⁵ .............................................. C06D 5/00
[52] U.S. Cl. .................... 102/531; 137/68.2; 222/5; 280/737
[58] Field of Search ................ 102/530, 531; 280/736, 280/737, 741; 137/68.1, 68.2; 222/3,5

[56] References Cited

U.S. PATENT DOCUMENTS

| | | | |
|---|---|---|---|
| 3,649,045 | 3/1972 | Smith et al. | 102/531 |
| 3,690,695 | 9/1972 | Jones, Sr. | 280/741 |
| 3,773,353 | 11/1973 | Trowbridge et al. | 280/737 |
| 3,856,180 | 12/1974 | Merrell | 280/737 |
| 3,868,124 | 2/1975 | Johnson | 280/737 |
| 3,930,666 | 1/1976 | Lynch et al. | 280/737 |
| 3,948,540 | 4/1976 | Meacham | 280/735 |
| 3,966,226 | 6/1976 | Roth | 280/737 |
| 5,022,674 | 6/1991 | Frantom et al. | 280/741 |
| 5,031,932 | 7/1991 | Frantom et al. | 280/741 |
| 5,076,607 | 12/1991 | Woods et al. | 280/737 |
| 5,257,819 | 11/1993 | Frantom et al. | 280/737 |

*Primary Examiner*—Harold J. Tudor
*Attorney, Agent, or Firm*—Frank P. Presta

[57] ABSTRACT

An inflation device including a pressure tank having stored therein a quantity of inflation gas under pressure, the pressure tank including a burst disk which prevents egress of the inflation gas from the tank, a sleeve member extending in substantially axial alignment with the burst disk, a piston having a first end portion slidably received in the sleeve member and having a second end portion which includes a cutting edge thereon for puncturing the burst disk. A first pyrotechnic material is positioned adjacent the first end portion of the piston, and a second pyrotechnic material is positioned externally of the sleeve member. Upon ignition of the first pyrotechnic material, a first combustion gas is produced which drives the piston to rupture the burst disk and permit the egress of the stored inflation gas. The sleeve member and the piston member are constructed to shield the second pyrotechnic material from the first combustion gas until after the piston has moved a predetermined distance and the burst disk has been ruptured. Upon the piston moving the predetermined distance a passage is created which enables the first combustion gas to contact and ignite the second pyrotechnic material to produce a second combustion gas which is operable to increase the temperature of the inflation gas, thereby providing an inflation device which has a delay between the release of the stored inflation gas and the heating thereof.

16 Claims, 3 Drawing Sheets

HYBRID INFLATOR

BACKGROUND OF THE INVENTION

The present invention generally relates to an inflator for an air bag or cushion and, more specifically, to the type of inflator known as a hybrid inflator.

it is known that if the early inflation rate of an air bag is too high, the resulting deployment forces can contribute to the possible injury of an occupant who is out of the normal seated position. If, however, the air bag inflation rate is maintained at a relatively low rate, primarily to reduce such deployment forces, full deployment of the air bag may not be timely achieved, and therefore the air bag may not provide the desired level of safety for the vehicle occupants.

It has for some time been appreciated that the goal of air bag design is to provide an inflator which initially has a relatively low or soft inflation rate (for a relatively few milliseconds) primarily to protect the out-of-position passenger, such as a standing child, who would be subject to large deployment forces, and thereafter to rapidly increase the inflation rate of the air bag to cause rapid and full inflation.

Therefore, a need has been created for an economical, reliable and effective inflation device which can achieve the above-described staged, variable inflation of an air bag. The inflation device of the present invention meets this need.

BRIEF DESCRIPTION OF THE PRIOR ART

The prior art discloses techniques for achieving a staged (bi-level) inflation of an air bag by utilizing an inflator which is capable of producing inflation gases with at least a low and a higher rate of gas production. With regard to air bag inflators generally, whether they are of the hybrid, stored gas variety or of the solid propellant (typically sodium azide) variety is the inclusion of an initiator or squib and a mass of gas producing or propellant material. As is known in the art and in response to a crash signal, the squib (or initiator) is activated which in turn causes the propellant material to burn. In the case of a hybrid inflator, the purpose of the propellant material is to heat the stored inflation gas thereby increasing the effective, released volume of same while also increasing the rate of egress of the inflation gases from the pressure tank. In this case, heated, stored gas is the primary source of inflation gases. In the solid propellant type of inflator, the squib causes the propellant to burn, the purpose of which is to generate a relatively inert, large volume of inflation gases.

In order to achieve the above-mentioned staged, variable inflation rate for an inflator, the prior art has proposed using a plurality of detonating devices to sequentially open restricted and unrestricted flow paths (see U.S. Pat. No. 3,741,580). Another type of device for generating the staged inflation has been proposed in U.S. Pat. No. 3,774,807, wherein upon activation of a single detonating element a piston moves to uncover a flow passage permitting the cold egress of stored gas from the pressure tank, and thereafter the piston is used to detonate a quantity of propellant which in turn heats the stored gases prior to exiting the inflator. Instead of opening a flow port as described above, U.S. Pat. No. 3,948,540 discloses the technique of using a spear thrower mechanism which punctures a shear disk to permit stored gas to flow through various exit ports and inflate the air bag. Still another technique to provide the staged inflation is to use a dual electro explosive device system wherein one detonator is used to rupture a disk which initially permits the stored gas to flow into the air bag and shortly thereafter to energize the second initiator which causes the propellant to burn and as such increases the rate at which gases exit the inflator. Examples of patents which disclose inflators using two or more electro explosive elements are U.S. Pat. Nos. 3,972,545, 4,007,685, 4,136,894 and 4,358,998. Additional patents which utilize variable orifice devices are U.S. Pat. Nos. 4,006,919, 4,018,457, 4,021,058, 4,203,616, 4,268,065 and 4,619,285. Other devices utilizing sliding members or disk piercing mechanisms are U.S. Pat. Nos. 3,910,596, 3,948,540, 3,966,226, 4,771,914 and 5,076,607.

The U.S. Pat. No. 5,076,607, to Woods et al the disclosure of which is incorporated herein by reference, discloses a hybrid inflator which includes a sliding piston having at one end a sharp edge for rupturing a first burst disk on a pressure tank and on its other end a second burst disk. The piston is movable to rupture the first burst disk in response to the build up of pressure acting on the second burst disk from the burning of the propellant material, thereby permitting egress of a stored inflation gas. The second burst disk is later ruptured by the continued build up of pressure due to the burning propellant, thereby enabling the heated combustion products to flow through the piston to increase the temperature of the stored inflation gas prior to its exit from the inflator.

While these known types of inflators work satisfactorily in some instances, the new and improved inflation device of the present invention represents a significant improvement thereover.

SUMMARY OF THE INVENTION

Accordingly, it is a primary object of the present invention to provide an economical, reliable and effective inflation device which is capable of providing staged, variable inflation of an air bag.

A more particular object of the invention is to provide an inflation device which uses only a single electronic initiator and two separate quantities of pyrotechnic material, the first of which is ignited by the initiator to drive a piston through a first burst disk which releases stored gas, and the second of which is ignited by the combustion products of the first only after the stored gas has been released, wherein the combustion products from the second pyrotechnic material are operable to heat the gas prior to exiting the inflator.

Another object of the invention is to isolate the second quantity of pyrotechnic material from the combustion products of the first until the piston has moved a predetermined distance and the stored gas has been released, whereupon the first combustion product is then operable to ignite the second quantity of pyrotechnic material, thereby providing a first delay between the release of the stored gas and the ignition of the second quantity of pyrotechnic material.

Yet another object of the invention is to provide a second rupture disk which isolates the second combustion product from the released gas until sufficient pressure is built up which ruptures the second burst disk, thereby providing a second delay between the ignition of the second pyrotechnic material and the heating of the released gas.

These and other objects and advantages of the present invention are achieved by providing an inflation device which includes a pressure tank having stored therein a quantity of inflation gas under pressure, the pressure tank including a burst disk which prevents egress of the inflation gas from the tank, a sleeve member extending in substantially axial alignment with the burst disk, a sliding piston having a first end portion received in the sleeve member and having a second end portion which includes means thereon for puncturing the burst disk, a first quantity of pyrotechnic material positioned adjacent the first end portion of the piston, means for igniting the first quantity of pyrotechnic material upon a predetermined condition, and a second quantity of pyrotechnic material positioned externally of the sleeve member. Upon ignition of the first quantity of pyrotechnic material, a first combustion gas is produced which drives the piston to rupture the burst disk, thereby permitting the egress of the stored inflation gas. The sleeve member and the piston member cooperate to insulate the second quantity of pyrotechnic material from the first combustion gas until after the piston has moved a predetermined distance and the burst disk has been ruptured. When the piston has moved a predetermined distance, a passage is defined which enables the first combustion gas to ignite the second quantity of pyrotechnic material which then produces a second combustion gas which is operable to heat the inflation gas.

DESCRIPTION OF THE DRAWINGS

Other objects and advantages of the subject invention will become apparent from a study of the following specification when viewed in light of the accompanying drawings, in which.

DETAILED DESCRIPTION

Figure 1:
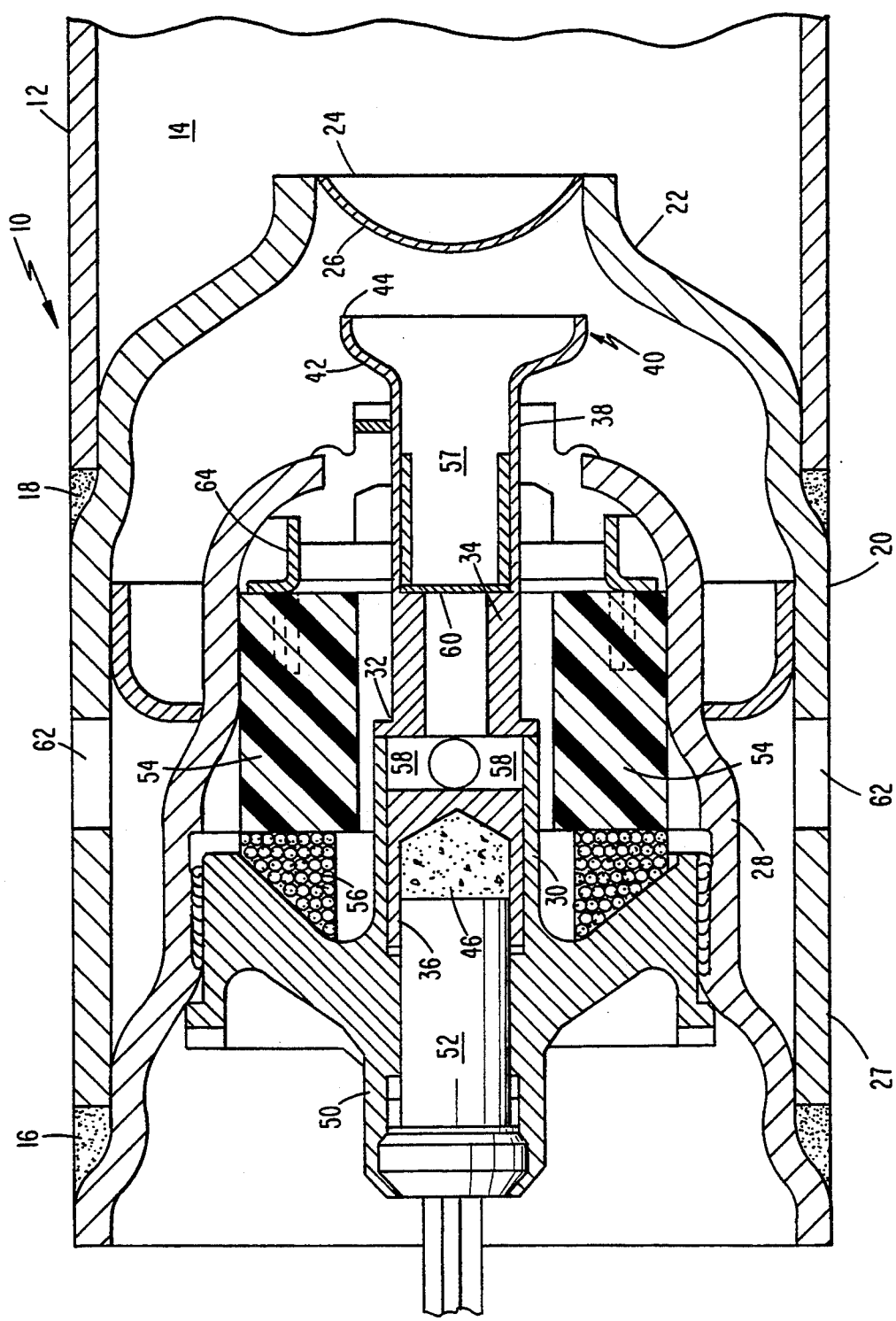
FIG. 1 is a side elevational view in section, with parts broken away, of a preferred embodiment of the inflation device of the present invention.
Figure 2:
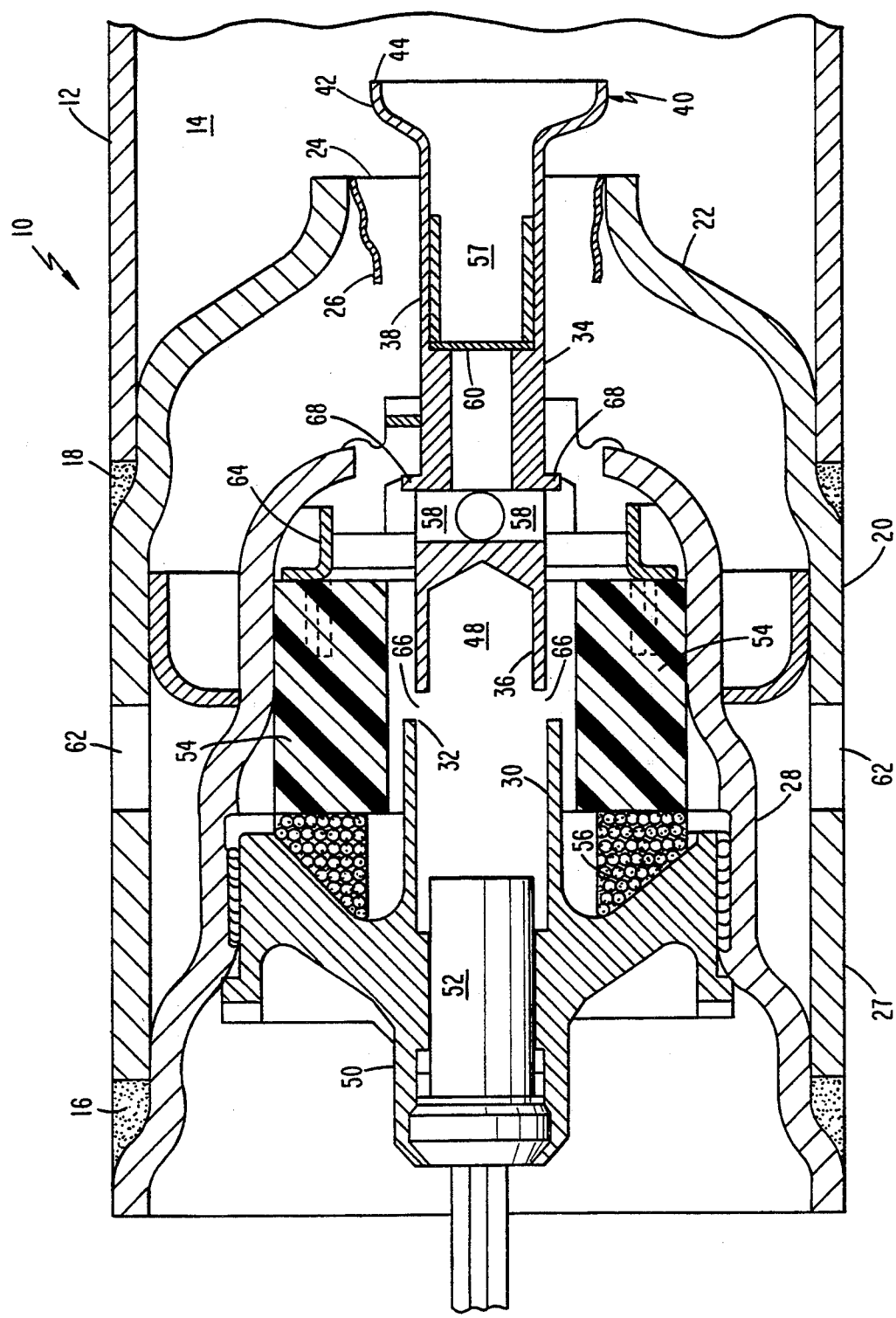
FIG. 2 is a side elevational view similar to FIG. 1, wherein the piston has ruptured the pressure tank burst disk.

Referring now to FIGS. 1 and 2, there is shown the hybrid inflator 10 of the present invention for inflating an air cushion such as an air bag usable in a vehicle occupant safety restraint system. The inflator 10 includes a pressure tank 12 which has an interior chamber 14 for storing a suitable compressed inert inflation gas such as Argon, although any other suitable gas may be used. The inflation gas may also be a mixture of Argon and another inert gas such as helium. Typically the amount of helium is approximately two percent (2%) by volume of the amount of Argon gas. The purpose of the helium is to provide a means for detecting defects in any of the weld joints such as 16 and 18. While the entire structure of the pressure tank 12 is not shown in the drawing, it is preferably of a known construction, such as the one disclosed in U.S. Pat. No. 5,076,607.

An end cap 20 closes the end of the pressure tank 12 and includes a neck portion 22 which defines a tank opening 24 which is closed by a closure means such as a first rupturable burst disk 26, preferably made of stainless steal, inconel or nickel. Secured to an end 27 of the end cap 20 is a gas generator housing 28. The housing 28 extends partially into the end cap 20. A sleeve member 30 is positioned in the housing 28 such that the end opening 32 therein is substantially axial alignment with the burst disk 26. A sliding piston 34 having a first end 36 extends through the opening 32 and is slidably received in the sleeve member 30. The piston has on its other end 38 means 40 for rupturing the burst disk 26 upon movement thereagainst. Rupturing means 40 preferably includes a flanged portion 42 having a sharp edge 44 thereon.

A first quantity of pyrotechnic material or booster charge 46 is positioned in the sleeve member 30. The booster charge may be formed of boron potassium nitrate or any other suitable pyrotechnic material. Preferably the end 36 of the piston 34 has an opening 48 therein in which the booster charge 46 is housed. An initiator housing 50 is secured to the gas generator housing 28. Inserted within the initiator housing 50 is an initiator or squib 52 of known construction which is operable to ignite the booster charge 46 in response to an electric control signal indicative of a crash situation. Squibs or initiators 52 are well known in the art and are not described further herein.

Figure 4:
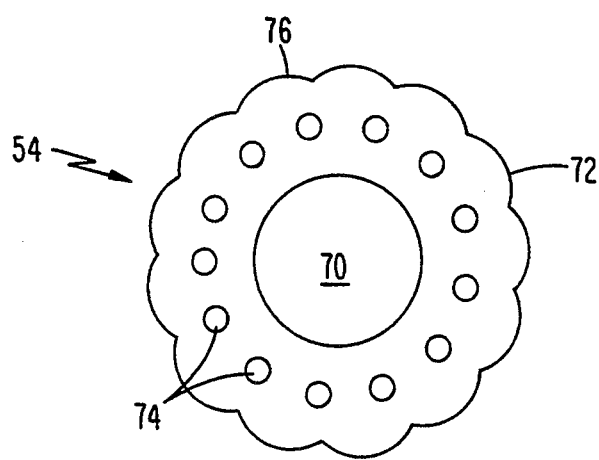
FIG. 4 is an end view of a preferred propellant or pyrotechnic device used in the present invention.

A second quantity of pyrotechnic material or propellant 54 is positioned in the gas generator housing 28, outside of the sleeve member 30. Preferably, the propellant material 54 is positioned therein such that it encircles the outside of the sleeve member 30 or the piston 34 or both. Preferably the propellant material 54 is ARCITE® propellant as disclosed in U.S. Pat. No. 3,723,205, which is incorporated herein by reference. However, any other suitable material may be used. As is known in the art, ARCITE propellant can be extruded to form a shape conformal with the housing. Preferably, the ARCITE propellant is shaped to form a tube 72 as shown in FIG. 4 having an undulated outer surface 76, and wherein at least a portion of the piston 34 extends into the interior 70 of the tube 72. The molded propellant 54 may include a plurality of axially extending passages 74 to control the burn rate thereof. Preferably, the propellant 54 is supported within the housing 28 by a metal retainer 64 having a plurality of openings therein coaxial with the openings in the propellant 54. Upon securement of the initiator housing 50 into the gas generator housing 28, the propellant 54 may be biased inwardly by the action of a sponge or spring element 56 or the like, thereby providing a modest preload on the propellant 54 to maintain it in place.

Preferably, piston end 38 includes a longitudinal extending passage 57 therein and at least one opening 58 in the sidewall thereof which enables fluid communication with the longitudinal passage 57. Preferably, a plurality of radially spaced openings 58 are provided in the sidewall of the piston 34. A second burst disk 60 of similar construction to burst disk 26 may be positioned in the longitudinal passage 57, the purpose of which will be described hereinafter.

The operation of the inflator 10 is a follows. The pressure tank 12 is initially filled to a pressure of between 2,000 and 4,000 psi with the inflation gas. It has been found that a pressure of approximately 3,000 psi is most suitable for the inflation of air bags. In this condition, the burst disk 26 prevents egress of the inflation gas. In response to a signal indicative of a crash situation, the initiator 52 ignites the booster charge 46 which produces a first combustion gas which is operable to move the piston 34 out of the sleeve member 30, thereby puncturing the burst disk 26. Upon puncturing the burst disk 26, the stored inflation gas immediately flows out of the pressure tank 12 and through the openings 62 in the end cap 20 to begin inflating the air bag (not shown), which would typically be secured about the inflator 10 in a known manner.

In accordance with the invention, the sleeve member 30 and the first end 36 of the piston 34 cooperate to isolate the second quantity of pyrotechnic material or propellant 54 from the first combustion gas generated by the booster charge 46 until the piston 34 has moved a predetermined distance and the burst disk 26 has been ruptured, thereby providing a first delay between the release of the inflation gas from the pressure tank 12 and the ignition of the propellant 54. When the piston 34 has moved the predetermined distance as shown in FIG. 2, a passage 66 is defined between the open end of the sleeve member 30 and the first end 36 of the piston 34, which enables the first combustion gas to communicate with and ignite the propellant 54. In the preferred embodiment of the present invention, when the piston 34 has moved the predetermined distance, the first end portion 36 thereof exits the sleeve member 30, thereby defining a passage 66 therebetween. However, other suitable means which enables a passage, such as passage 66, to be opened when the piston 34 has moved a predetermined distance may be used.

The burning of propellant 54 produces a second combustion gas which flows through piston openings 58, into the longitudinal passage 57 and out the end portion 38 of the piston 34, whereupon it heats the stored inflation gas thereby increasing the effective, released volume of same while also increasing the rate of egress of the inflation gases from the pressure tank 12.

The second burst disk 60 may be provided in the longitudinal opening 57 to block the flow of the second combustion gas from the propellant 54 until the pressure therefrom builds to a predetermined magnitude, whereupon the second burst disk 60 ruptures to allow the second combustion gas to flow through the piston 34 and heat the inflation gas. The second burst disk 60 provides a second delay between the ignition of the propellant 54 and the heating of the inflation gas. The second burst disk 60 also assists in the ignition of the propellant 54 by blocking the flow of the combustion products therefrom until the predetermined pressure has been reached. While in the preferred embodiment the second burst disk 60 is positioned in the longitudinal passage 57, it may be positioned at any other suitable location to achieve the same function.

The piston may include a stop member 68 which engages the gas generator housing 28 upon moving the predetermined distance to stop movement thereof. The stop member 68 or any other suitable part of the piston 34 may, upon moving the predetermined distance, cause an interference fit with the gas generator housing 28 such that the piston is maintained in the stroked position after it has ruptured the burst disk 26 so that it is not forced back to it original position by the release of the inflation gas. In addition, shear pins (not shown) of known construction, or any other suitable retaining means may be used to hold the piston 34 in place until the pressure from the first combustion gas has reached a sufficient magnitude to create a force adequate to break the shear pins, thereby enabling the piston 34 to move within the sleeve member 30. Such shear pins are disclosed in U.S. Pat. No. 5,076,607.

Figure 3:
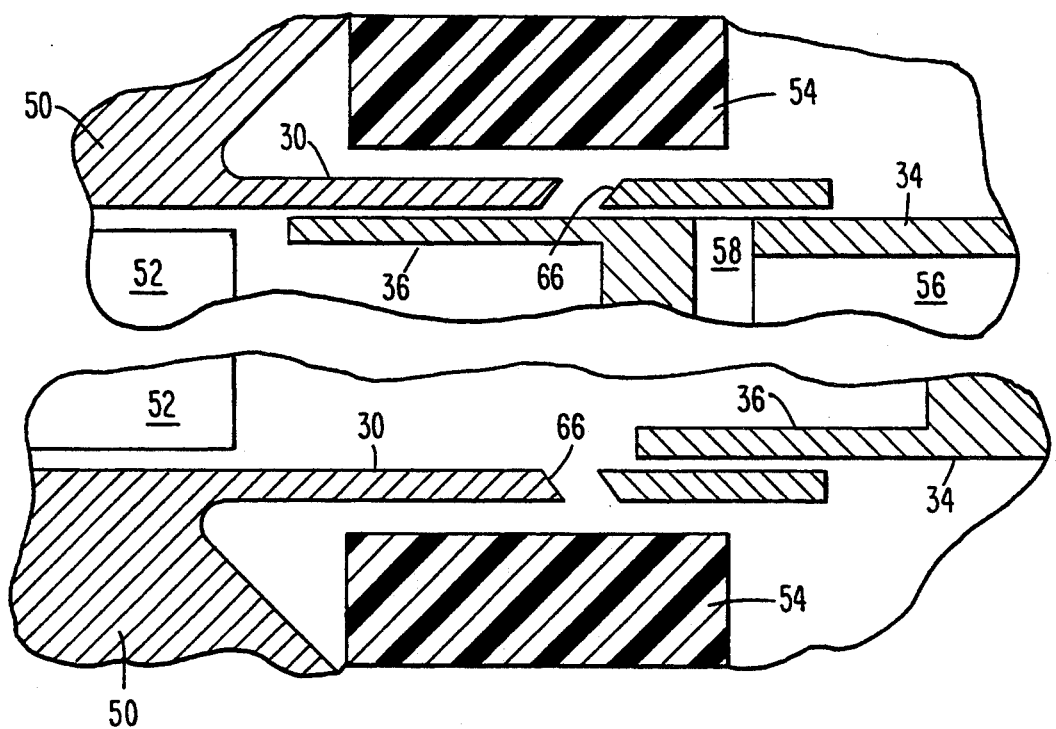
FIG. 3 is a partial side elevational view, with parts broken away, of an alternative embodiment of the present invention.

Referring now to FIG. 3 an alternative embodiment of the inflator device 10 is shown. In the embodiment of FIG. 3, the sleeve member 30 includes at least one opening 66 therein which is blocked by the end portion 36 of piston 34 (as shown in the upper half of FIG. 3) until the piston 34 has moved a predetermined distance (as shown in the lower half of FIG. 3). When the piston 34 has moved the predetermined distance, the opening 66 in the sleeve member 30 is no longer blocked by the piston end portion 36, so that the first combustion gases from the booster charge are able to flow through the opening 66 into communication with the propellant 54 for ignition thereof. In this embodiment, it is not necessary for the piston end portion 36 to fully exit the sleeve member 30. It only must move a sufficient distance to expose the opening 66.

While not shown in the drawings, it is also considered within the scope of the present invention to provide a passage in the piston itself, rather than in the sleeve member 30, which is initially blocked by the sleeve member 30, but becomes unblocked when the piston 34 has moved a predetermined distance, thereby enabling the first combustion gas to flow through the passage in the piston 34 to ignite the propellant 54.

As can be seen from the above description, the present invention provides a device which achieves staged deployment of an air bag by selectively choosing the distance that the piston must travel before the first combustion gas from the booster charge 46 is allowed to communicate with and ignite the propellant material 54, thereby providing a delay between the release of the inflation gas and the heating thereof. An additional delay can also be achieved by selectively choosing the rupture pressure of the second burst disk 60. The significance of this is that the inflator 10 provides for the slow, early onset of air bag deployment which results in lower air bag deployment forces to protect out-of-position occupants of the vehicle. In addition, any deployment doors used to enclose the air bag, in its stored condition, would also be subject to these lower deployment forces when they are opened, thereby providing for more controlled opening of the deployment doors. In addition, with regard to small vehicles which may be characterized by a severe crash pulse signature requiring the more rapid deployment of the air bag, the predetermined piston traveling distance and the second burst disk 60 rupture pressure can be chosen to enable the communication of the heated propellant combustion gas with inflation gas to occur relatively quickly.

While in accordance with the patent statute the preferred forms and embodiments of the invention have been illustrated and described, it will be apparent to those of ordinary skill in the art that various changes and modifications may be made without deviating from the inventive concepts set forth above.

What is claimed is:

1. Inflator device, comprising a pressure tank having stored therein a quantity of inflation gas under pressure, said pressure tank including closure means which prevents egress of said gas from said tank, a sleeve member extending in substantially axial alignment with said closure means, a piston having a first end portion slidably received in an open end of said sleeve member and having a second end portion which includes means thereon for puncturing said closure means, a first pyrotechnic material positioned adjacent said first end portion of said piston, means for igniting said first quantity of pyrotechnic material upon the occurrence of a predetermined condition, and a second pyrotechnic material positioned externally of said sleeve member, whereby upon ignition of said first pyrotechnic material a first combustion gas is produced which drives said piston a predetermined distance toward said closure means such that said second end portion thereof punctures said closure means to permit the stored inflation gas to exit the inflation device through a first passageway, and further wherein each of said sleeve member and said first end portion is sized in length so that said sleeve member and said first end portion cooperate to shield said second pyrotechnic material from said first combustion gas until after said piston has moved said predetermined distance and said closure means has been ruptured, driving of said piston creating a passage adjacent said open end of said sleeve member which enables said first combustion gas to contact and ignite said second pyrotechnic material after said piston has moved said predetermined distance to produce a second combustion gas which contacts the inflation gas by flowing through a second passageway in said inflator device in communication with said tank to increase the termperature of said inflation gas, wherein shielding of said second pyrotechnic material delays the flow of said second combustion gas into said inflation gas exiting the inflator device and the heating thereof.

2. The inflator device as defined in claim 1 wherein said closure means is a burst disk.

3. The inflator device as defined in claim 1, wherein when said piston has moved said predetermined distance, said first end portion of said piston exits said sleeve member to create said passage therebetween for the ignition of said second pyrotechnic material.

4. The inflator device as defined in claim 1, wherein said sleeve member includes at least one opening therein which is blocked by said piston until said piston has moved said predetermined distance, thereupon unblocking said opening and creating said passage.

5. The inflator device as defined in claim 1, wherein said second end portion of said piston has a longitudinal passage therein as said second passageway and at least one opening in a sidewall thereof, said at least one opening providing fluid communication between said second pyrotechnic material and said longitudinal passage to enable said second combustion gas to flow into said one opening, through said longitudinal passage, and out said second end portion of said piston to heat said inflation gas.

6. The inflator device as defined in claim 5, and further comprising a second closure means positioned in said longitudinal passage which is operable to block said second combustion gas from flowing through said longitudinal passage until a predetermined pressure is built up from the production of said second combustion gas, whereupon said second closure means is ruptured to enable said second combustion gas to flow through said longitudinal passage, thereby providing a second delay between the release of said inflation gas and the heating thereof.

7. The inflator device as defined in claim 6 wherein said second closure means is a burst disk.

8. The inflator device as defined in claim 1, wherein said second pyrotechnic material is positioned substantially around the outside of said sleeve member and said piston.

9. The inflator device as defined in claim 8, wherein said second pyrotechnic material has a cylindrical configuration, and wherein said sleeve member and said piston extend into the interior thereof.

10. The inflator device as defined in claim 1, wherein said means for puncturing said closure means includes a flanged portion on said second end of said piston, said flanged portion having a cutting edge thereon.

11. The inflator device as defined in claim 1, wherein said first end of said piston member includes a bore therein, said first pyrotechnic material being positioned in said bore.

12. The inflator device as defined in claim 1, and further comprising means for stopping said piston when it has moved said predetermined distance.

13. The inflation device of claim 1 further comprising means for blocking the flow of said second combustion gas through said second passageway until a predetermined pressure is built up to further delay flow of said second combustion gas into said inflation gas.

14. The inflation device of claim 13 wherein said second passageway is a longitudinal passage in said piston and said means for blocking is located within said longitudinal passage.

15. The inflator device of claim 14 wherein said means for blocking is a burst disk.

16. Inflator device, comprising a pressure tank having stored therein a quantity of inflation gas under pressure, said pressure tank including closure means which prevents egress of said gas from said tank, a sleeve member extending in substantially axial alignment with said closure means, a piston having a first end portion slidably received in an open end of said sleeve member and having a second end portion which includes means thereon for puncturing said closure means, a first pyrotechnic material positioned adjacent said first end portion of said piston, means for igniting said first quantity of pyrotechnic material upon the occurrence of a predetermined condition, and a second pyrotechnic material positioned externally of said sleeve member, whereby upon ignition of said first pyrotechnic material a first combustion gas is produced which drives said piston a predetermined distance toward said closure means such that said second end portion thereof punctures said closure means to permit the stored inflation gas to exit the inflation device through a first passageway, and further wherein each of said sleeve member and said first end portion is sized in length so that said sleeve member and said first end portion cooperate to shield said second pyrotechnic material from said first combustion gas until after said piston has moved said predetermined distance and said closure means has been ruptured, driving of said piston creating a passage adjacent said open end of said sleeve member which enables said first combustion gas to contact and ignite said second pyrotechnic material after said piston has moved said predetermined distance to produce a second combustion gas which contacts the inflation gas by flowing through a second passageway in said inflator device in communication with said tank to increase the temperature of said inflation gas, said second passageway located in said piston and including a means for blocking flow of said second combustion gas into said inflation gas until a predetermined pressure is built up, wherein said shielding and said means for blocking delay release of said second combustion gas into said inflation gas exiting the inflator device.

* * * * *